(12) United States Patent
Matsumoto et al.

(10) Patent No.: US 7,400,910 B2
(45) Date of Patent: Jul. 15, 2008

(54) SPEAKER SOUND ENHANCEMENT FOR A MOBILE TERMINAL

(75) Inventors: Yoshiya Matsumoto, Kawasaki (JP); Kouji Hirata, Kato-gun (JP); Yoshito Fukata, Kato-gun (JP); Katsushige Kohri, Kato-gun (JP)

(73) Assignees: Fujitsu Limited, Kawasaki (JP); NTT DoCoMo, Inc., Tokyo (JP)

( * ) Notice: Subject to any disclaimer, the term of this patent is extended or adjusted under 35 U.S.C. 154(b) by 493 days.

(21) Appl. No.: 10/864,505

(22) Filed: Jun. 10, 2004

(65) Prior Publication Data
US 2004/0253995 A1 Dec. 16, 2004

(30) Foreign Application Priority Data
Jun. 13, 2003 (JP) ............... 2003-169822

(51) Int. Cl.
*H04B 1/38* (2006.01)
(52) U.S. Cl. .................. 455/570; 381/345; 381/348; 381/349; 381/351; 381/386
(58) Field of Classification Search ........... 455/569.2, 455/575.1, 570; 381/71.7, 386, 345, 348, 381/349, 351; 379/433.02, 432, 430, 420.02, 379/428.01
See application file for complete search history.

(56) References Cited
U.S. PATENT DOCUMENTS
5,883,966 A * 3/1999 Kubo ..................... 381/386

| | | | | |
|---|---|---|---|---|
| 6,002,949 A * | 12/1999 | Hawker et al. | ........... | 455/569.1 |
| 6,160,897 A * | 12/2000 | Klein | ........... | 381/396 |
| 6,490,361 B1 * | 12/2002 | Klein | ........... | 381/353 |
| 6,526,150 B2 * | 2/2003 | Kelly et al. | ........... | 381/353 |
| 6,834,744 B2 * | 12/2004 | Toki | ........... | 181/148 |
| 7,058,366 B2 * | 6/2006 | Patterson | ........... | 455/90.3 |
| 7,103,393 B2 * | 9/2006 | Hwang | ........... | 455/569.1 |

FOREIGN PATENT DOCUMENTS
JP 2003-60757 2/2003
JP 2003-134201 5/2003

* cited by examiner

*Primary Examiner*—Edward Urban
*Assistant Examiner*—Fayyaz Alam
(74) *Attorney, Agent, or Firm*—Kratz, Quintos & Hanson, LLP

(57) ABSTRACT

The present invention relates to a mobile terminal such as a mobile telephone or the like which has a speaker built in, and realizes a sound emission structure for separately extracting the front output and back output of the speaker in a plurality of directions. The construction of this mobile terminal comprises a first sound emission part which is formed in one surface part of a case having a speaker built in, and which conducts the front output of the speaker to the outside of the case, a sound conducting hole which is formed in case internal members disposed inside the case, and which causes the back output of the speaker to pass through the interior of the case, and conducts this output to the other surface of the case, and a second sound emission part which is formed in the other surface part of the case, and which conducts the back output from the sound conducting hole to the outside of the case.

6 Claims, 9 Drawing Sheets

SPEAKER SOUND ENHANCEMENT FOR A MOBILE TERMINAL

BACKGROUND OF THE INVENTION

1. Field of the Invention

The present invention relates to various types of mobile terminals having built-in speakers, such as mobile telephones, PHS (personal handyphone systems), other mobile information terminals and the like, and more particularly relates to the sound-emitting structure of a mobile terminal which is devised so that the output of the speaker can be emitted from a plurality of the surface parts of the case.

2. Description of the Related Art

For example, mobile telephones include mobile telephones that have a folding structure as shown in FIGS. 1 and 2. FIG. 1 is an external view which shows a mobile telephone in an open state. FIG. 2 is an external view as seen from the back, which shows the mobile telephone in a closed state. This mobile telephone 2 is constructed so that an operating part 4 and a display part 6 can be folded up by means of a hinge mechanism 8. A plurality of key buttons 10 such as character keys or the like are disposed in the operating part 4, and a microphone 14 is disposed on the inside of a sound intake hole 12. An LCD display 16 is disposed in the display part 6, and a receiver 20 is disposed on the inside of a sound emission hole 18. Furthermore, a sound emission hole 22 is formed in the back side of the operating part 4, and a speaker 24 is installed on the inside of this sound emission hole 22.

Such a mobile telephone 2 is ordinarily carried in a folded state as shown in FIG. 2. When a call arrives, a calling sound is emitted from the speaker 24. During communications, the mobile telephone is used in an open state as shown in FIG. 1, and communications sound is emitted from the receiver 20, so that this sound is heard by the user.

Prior patent documents relating to the sound emission structures of such mobile telephones and communications terminal devices include Japanese Patent Application Laid-Open Nos. 2003-60757 and 2003-134201.

In FIGS. 4 and 5 and the description of these figures in Japanese Patent Application Laid-Open No. 2003-60757, a mobile telephone terminal is disclosed which is devised so that two sound holes are formed in the front side of a display device part or an operating device part for an acoustic converter which is disposed in the display device part or operating device part for causing sound to be emitted on the back side of the terminal, and the voice sound that is emitted from the sound emission surface of this acoustic converter is emitted from the sound holes on the display surface so that this sound can be heard by the user.

Furthermore, in Japanese Patent Application Laid-Open No. 2003-134201, a structure of a mobile telephone in which a sound hole is formed in the side surface part of a housing that covers the back side of a speaker, and a calling sound is emitted from the side surface part of the close housing, is disclosed as a structure that allows the calling sound to be sufficiently heard even when the housing is closed.

In cases where not only a calling sound but also communications sound is output from the speaker 24, for example, in cases where the mobile telephone is used as a hands-free device or the like, if the mobile telephone is placed on a desk top to block the sound emission hole 22, the sound volume of the communications sound will be reduced so that the communications sound becomes difficult to hear and, accordingly, the degree of understanding and degree of clarity will drop. Furthermore, if the sound emission hole 22 is blocked, the level of the calling sound drops.

In regard to such problems, it is conceivable to use a configuration in which a speaker is disposed on the side of the key buttons 10 of the operating part 4 separately from the speaker 24 used for the calling sound, and communications sound is output from this separate speaker. However, the disposal of such a speaker requires a switching mechanism that switches the two speakers according to the mode of use, so that the structure of the mobile terminal such as a mobile telephone or the like is complicated, thus hindering a reduction in the size and weight of the mobile terminal. In regard to this problem, in the case of the sound-emitting structures disclosed in the abovementioned patent documents, a calling sound can be emitted from the front and side of the case and heard by the user without installing a separate speaker.

However, in cases where the speaker disposed inside the case of a mobile terminal such as a mobile telephone or the like is large relative to the size of the case, although calling sounds or the like can be emitted by forming a sound emission hole adjacent to the speaker or in the case that covers the back side of the acoustic converter as in the techniques described in the abovementioned patent documents, a sufficient sound emission output cannot be obtained in such a simple sound emission structure in which a sound emission hole is simply formed in the case, if the size of the speaker is reduced and the density of the mounted parts to the mobile terminal is increased. If the wiring boards and the like disposed inside the case hinder the emission of sound and the sound is diffused inside the case, this causes a reduction in the sound emission output to the outside of the case, and there is a danger that this will cause a deterioration of the degree of understanding and degree of clarity in the communications voice sound having a different band than the calling sound. These problems are not disclosed in the abovementioned patent documents and cannot be solved by the techniques disclosed in these references.

SUMMARY OF THE INVENTION

The present invention relates to a mobile terminal such as a mobile telephone or the like having a built-in speaker, and it is an object of the present invention to provide a mobile terminal realizing a sound emission structure which is capable of separately extracting a front output and a back output of the speaker in a plurality of directions.

In order to achieve the abovementioned object, a mobile terminal of the present invention has a construction comprising a first sound emission part which is formed in one surface part of the case having a speaker built in, and which conducts the front output of the speaker to the outside of the case, a sound conducting hole which is formed in case internal members disposed inside the case, and which causes the back output of the speaker to pass through the interior of the case, and conducts this output to another surface of the case, and a second sound emission part which is formed in this other surface part of the case, and which conducts the back output from the sound conducting hole to the outside of the case.

In such a construction, the front output of the speaker is emitted from the first sound emission part formed in one surface part of the case, and the back output of the speaker is conducted to another surface of the case via the sound conducting hole formed in the case internal members, and is emitted from the second sound emission part formed in this other surface part of the case. Depending on a mode of use of the mobile terminal, there may be cases in which the first sound emission part is blocked, or cases in which the second sound emission part is blocked. In the case of such a sound emission structure, the front output of the speaker is obtained from the first sound emission part in cases where the second sound emission part is blocked, and the back output of the speaker is obtained from the second sound emission part in cases where the first sound emission part is blocked, so that the output of the speaker can be extracted regardless of the mode of use. Accordingly, there is no drop in the sound emission level, and hence no drop in the degree of understanding or degree of clarity. In this case, the front output and back output of the speaker are not outputs that envision absolute outputs; if the back surface side of the speaker is used as the front surface, this output becomes the front output, and if the front surface side of the speaker is used as the back surface, this output becomes the back output.

In order to achieve the abovementioned object, a construction may also be used in which the case comprises a first case and a second case, the first sound emission part is formed in the first case which covers the front surface of the speaker, and the second sound emission part is formed in the second case. The first case is constituted by the front case or back case of the mobile terminal, and when the first case is the back case, the second case is the front case, whereas when the first case is the front case, the second case is the back case. Accordingly, the first sound emission part or second sound emission part of the present invention may be formed in either the front case or back case.

In order to achieve the abovementioned object, a construction may also be used in which a speaker supporting member that supports the speaker is included in the case internal members, and this speaker supporting member is fastened to a wiring board incorporated in the case. If such a construction is used, since the speaker is supported by the speaker supporting member and fastened to a wiring board, the compact speaker mounting structure can be simplified.

In order to achieve the abovementioned object, a construction may also be used in which the sound conducting hole is a tubular part which possesses air-tightness. As a result of such a construction, the back sound is efficiently conducted to the second sound emission part without leaking into the interior of the case from the sound conducting hole.

In order to achieve the abovementioned object, a construction may also be used in which a sound conducting hole which has an area that is smaller than the back surface side area of the speaker is formed in the speaker supporting member that covers the back surface side of the speaker. As a result of such a construction, there is no loss of the front output of the speaker due to the extraction of the back output.

Furthermore, examples of the special features and advantages of the present invention may be cited as follows:

(1) A sound emission structure which can extract and emit the front output and back output of the speaker, and which is highly convenient, is provided.

(2) The output of the speaker can be efficiently conducted and emitted via the sound conducting hole without being blocked by the case internal members.

(3) In a mobile terminal of the present invention, if a construction is used in which a speaker supporting member that supports the speaker is included in the case internal members, and this speaker supporting member is fastened to a wiring board contained in the case, the speaker can be mounted on the wiring board by means of the speaker supporting member, so that mounting of the speaker can be facilitated.

(4) In a mobile terminal of the present invention, if the sound conducting hole is constructed as a tubular part that possesses air-tightness, the leakage of the back output of the speaker into the interior of the case can be prevented.

(5) In a mobile terminal of the present invention, if a sound conducting hole which has an area that is smaller than the back surface side area of the speaker is formed in the speaker supporting member that covers the back surface side of the speaker, the back output of the speaker can be emitted via the sound conducting hole without losing the front output.

BRIEF DESCRIPTION OF THE DRAWINGS

Furthermore, other objects, features and advantages of the present invention will become much clearer by referring to the accompanying drawings and respective embodiments.

DESCRIPTION OF THE PREFERRED EMBODIMENTS

The mobile terminal of the present invention includes mobile telephones, PHS (personal handyphone systems), PDA (personal digital assistants), PC (personal computers), hand-held PC (hand-held personal computers), and other information mobile terminals. The mobile terminal of the present invention may be any of these terminals, as long as the terminal has a speaker built in.

Figure 1:
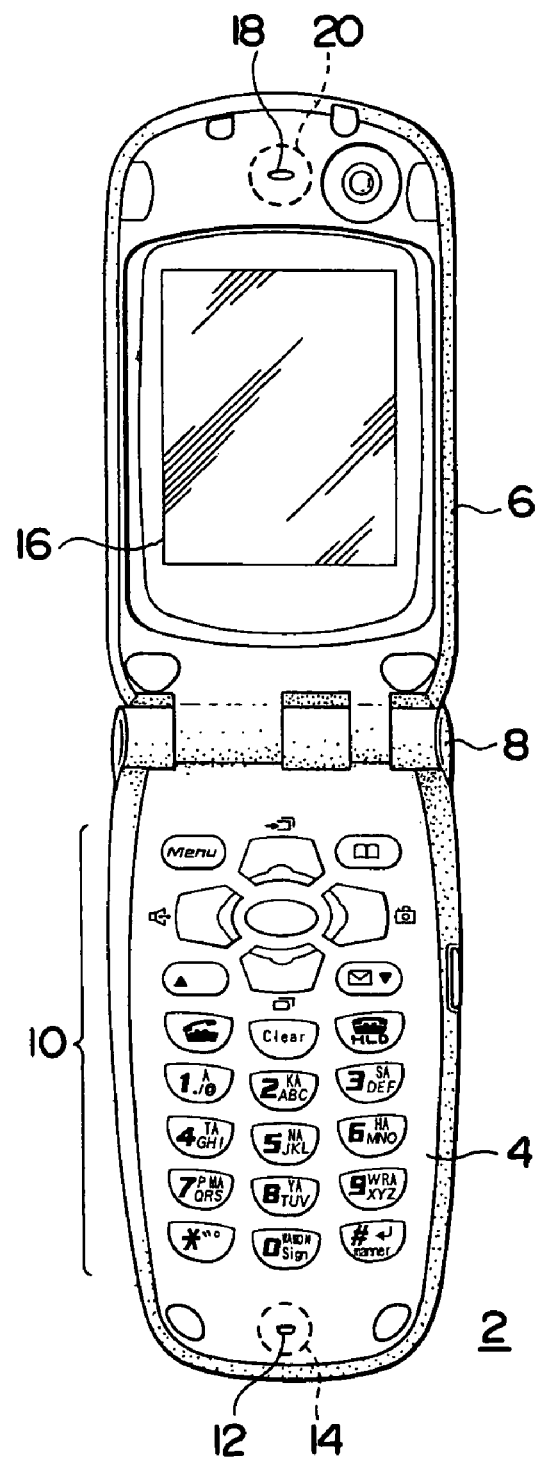
FIG. 1 is a diagram which shows the open state of a foldable mobile telephone.
Figure 2:
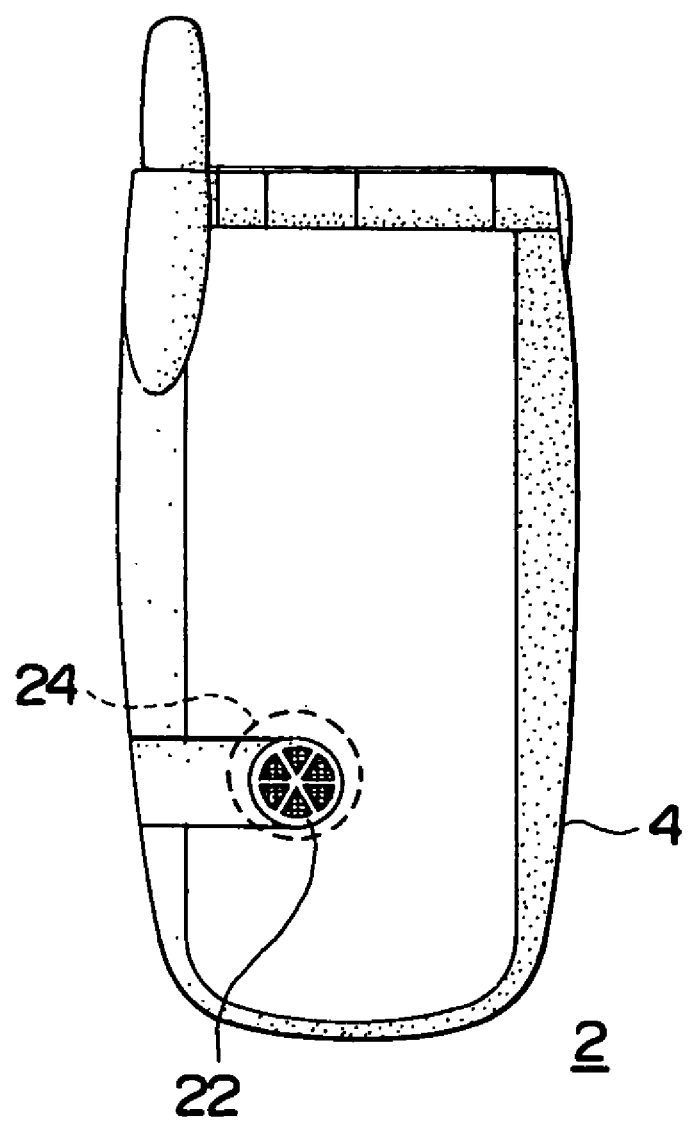
FIG. 2 is a diagram which shows the mobile telephone in a closed state.
Figure 3:
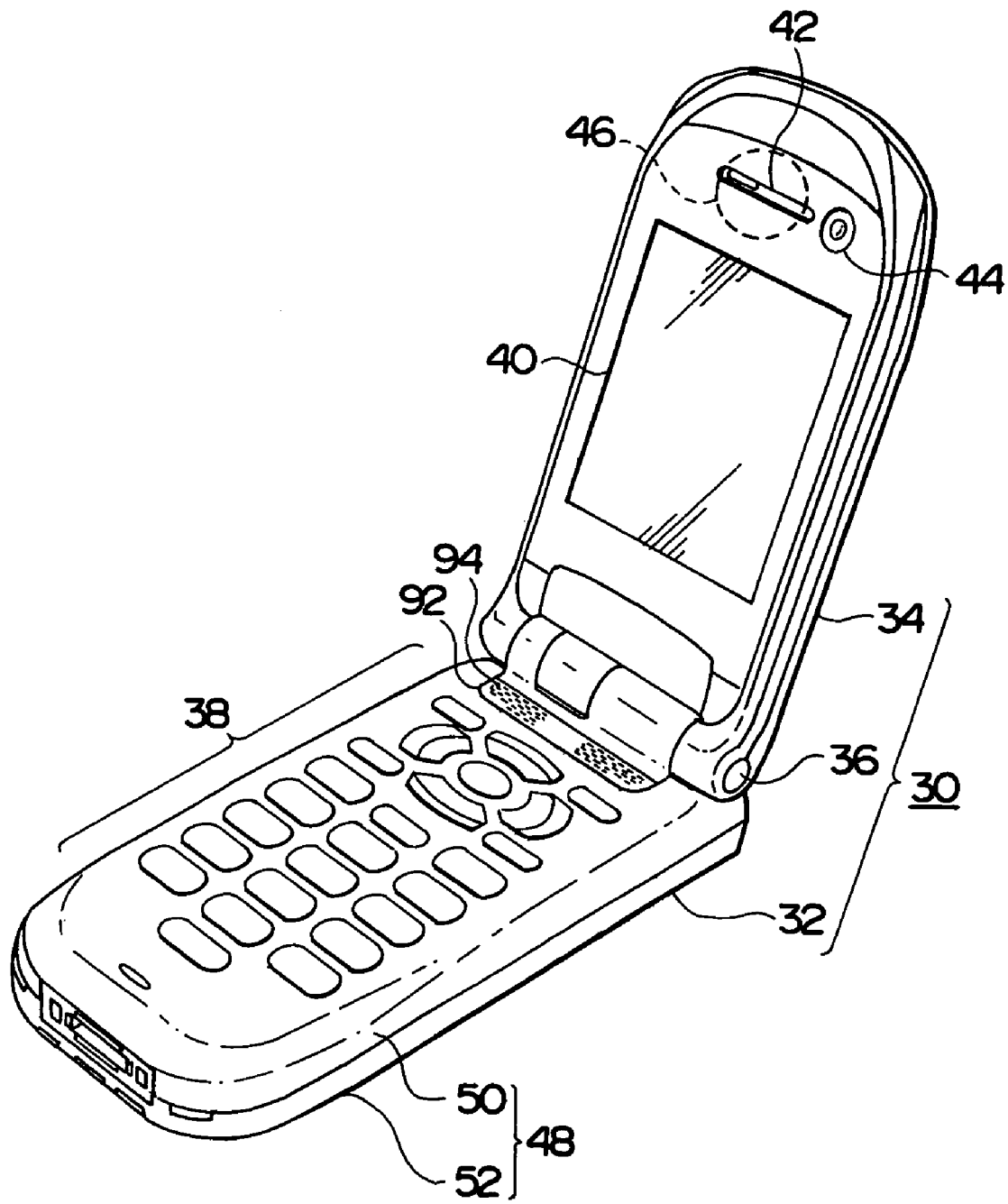
FIG. 3 is a perspective view which shows a mobile telephone according to an embodiment of the present invention.
Figure 4:
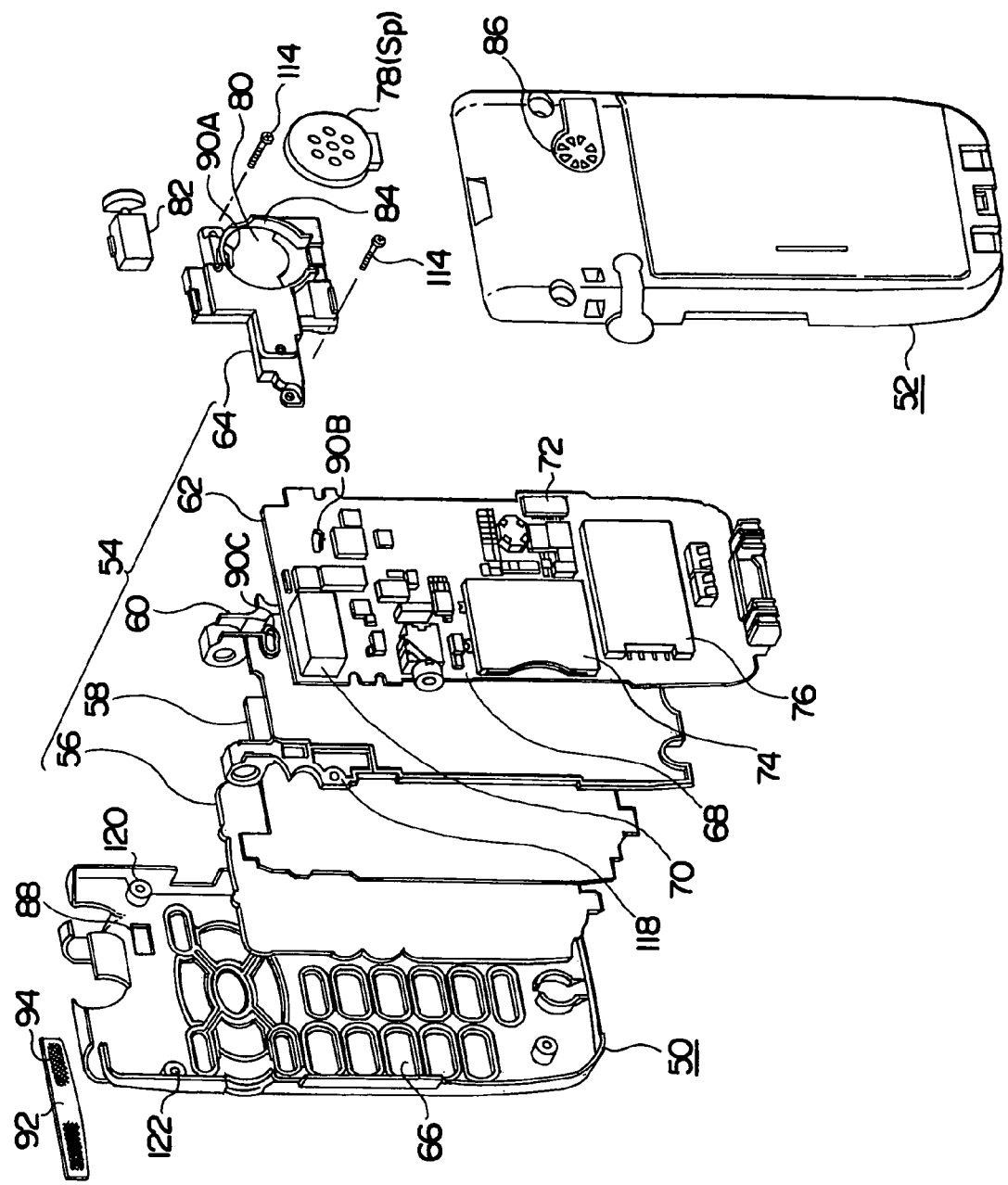
FIG. 4 is an exploded perspective view which shows the operating part of the mobile telephone.

Accordingly, a mobile telephone will be described as an embodiment with reference to FIGS. 3 and 4. FIG. 3 is a perspective view showing the open state of a mobile telephone according to an embodiment of the present invention, and FIG. 4 is an exploded perspective view showing the operating part of the same.

This mobile telephone 30 has a folding structure, and is constructed so that an operating part 32 and display part 34 can be folded by means of a hinge part 36. A plurality of key buttons 38 such as character keys or the like are disposed in the operating part 32, and an LCD display 40 is disposed in the display part 34. Furthermore, a sound emission hole 42 and a camera 44 are disposed in this display part 34, and a receiver 46 is disposed on the inside of the sound emission hole 42.

The case 48 on the side of the operating part 32 is constructed by joining a front case 50 as a first case, and a back case 52 as a second case. These front and back cases 50 and 52 are formed from synthetic resin molded bodies, for example, but the constituent material may also be a metal. In this case, the back case 52 may also be the first case, and the front case 50 may also be the second case. As is shown in FIG. 4, a key pad 56, dome key 58, key case 60, wiring board 62 and speaker holder 64 are incorporated in that order from the side of the front case 50 as case internal members 54 in the case 48. The key pad 56 constitutes key buttons 38 that are exposed in respective key windows 66 in the front case 50. The dome key 58 is a switch which is opened and closed by the pressing and release of the key buttons 38. The key case 60 constitutes a partition wall that protects the dome key 58. A wireless transmission part 68, antenna 70, control part 72, memory card attachment/detachment part 74, SIM card attachment/detachment part 76 and various other types of circuit parts constituting functional parts of the mobile telephone 30 are mounted on the wiring board 62. Furthermore, the speaker holder 64 is a supporting member that supports the speaker 78 and the like; a speaker attachment part 80 is formed in this speaker holder 64, and the speaker 78 is fastened to this speaker attachment part 80 by means of a fastening member such as a pressure sensitive adhesive double coated tape or the like. In this case, the speaker holder 64 also constitutes a supporting member that supports a vibrator 82, and this vibrator 82 is similarly attached by means of an adhesive material or the like. The speaker holder 64 to which the speaker 78 and vibrator 82 are thus attached is fastened to the inside surface part of the front case 50 by fastening means such as screws or the like. In this case, for example, the speaker attachment part 80 that is formed in the speaker holder 64 is provided with an annular surrounding wall 84 corresponding to the disk form speaker 78. Furthermore, the speaker holder 64 is disposed so as to cover the radio transmission part 68, and also constitutes a shielding member by grounding a metal layer formed on the surface thereof.

Furthermore, a sound emission hole 86 is formed as a first sound emission part used for the front output of the speaker 78 in (for example) the back case 52 which constitutes one surface part of the case 48, and a rectangular sound emission hole 88 is formed as a second sound emission part used for the back output of the speaker 78 in the front case 50, for example, which constitutes the other surface part of the case 48. Corresponding to this sound emission hole 88, a sound conducting hole 90A is formed in the speaker holder 64 (of the case internal members 54), a sound conducting hole 90B is formed in the wiring board 62, and a sound conducting hole 90C is formed in the key case 60. These sound conducting holes 90A, 90B and 90C are combined to form a sound conducting hole 90 (FIG. 9) as means for conducting the back output of the speaker 78 to the sound emission hole 88 on the side of the front case 50.

Figure 5:
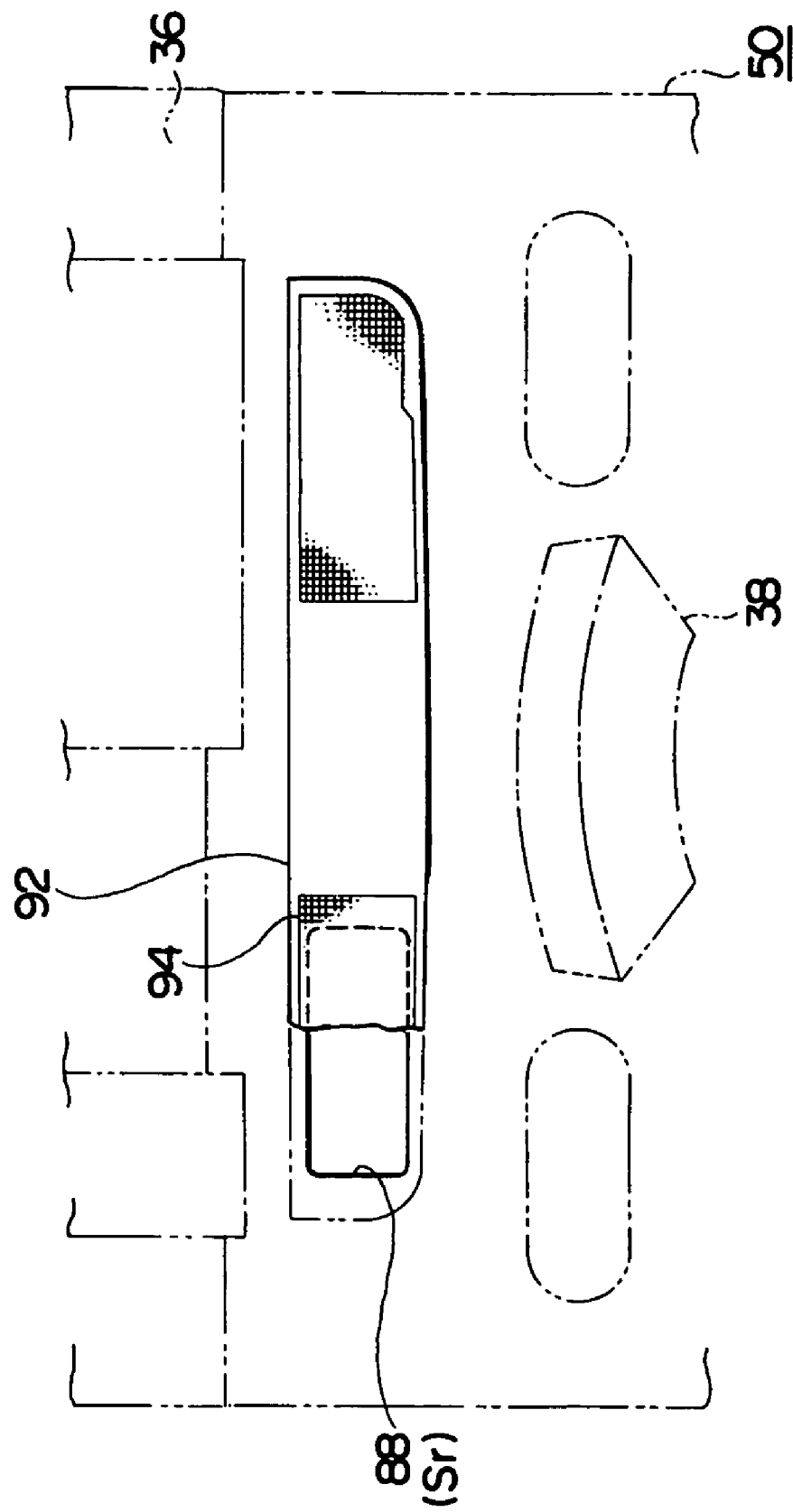
FIG. 5 is a diagram which shows the sound emission part of the operating part.

Furthermore, as is shown in FIG. 5, a front panel 92 which covers the sound emission hole 88 is disposed on the front surface side of the front case 50, and innumerable through-holes 94 are formed in this front panel 92. This front panel 92 is disposed to cover the sound emission hole 88 for allowing the emission of sound via the through-holes 94, and preventing dust from entering the interior of the case from the outside. Furthermore, the opening area Sr of the sound emission hole 88 is smaller than the back surface area Sp of the speaker 78 (Sp>Sr).

Figure 6:
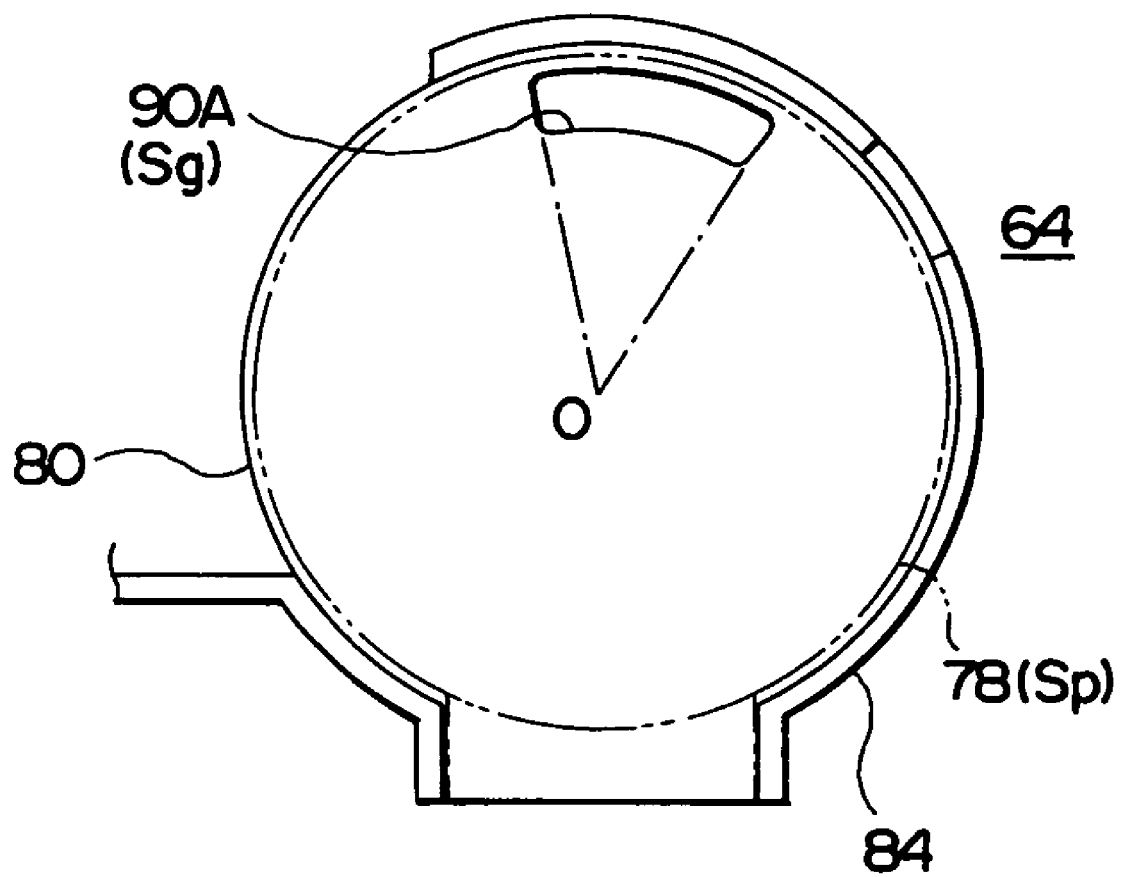
FIG. 6 is a diagram which shows the speaker attachment part and sound conducting hole of the speaker holder.

Next, the sound conducting hole 90 will be described with reference to FIGS. 6, 7, 8 an 9. FIG. 6 is a diagram which shows the speaker attachment part 80 of the speaker holder 64, FIG. 7 is an exploded perspective view which shows the speaker holder 64 and wiring board 62 as seen from the back side, FIG. 8 is an exploded perspective view which shows the construction of the speaker holder 64 and the sound conducting hole portions of the wiring board 62 and key case 60, and FIG. 9 is a partial longitudinal sectional view which shows the sound conducting structure of the operating part 32.

As is shown in FIG. 6, the sound conducting hole 90A of the speaker holder 64 is formed in the vicinity of the wall surface part surrounded by the surrounding wall 84 of the speaker attachment part 80 covered by the back surface part of the attached speaker 78. In the present embodiment, this sound conducting hole 90A is a fan-shaped through-hole which has the circular arc of a concentric circle centered on the center O of the speaker attachment part 80. When Sg is the sound conducting area of this sound conducting hole 90A, this sound conducting area Sg is set at a value that is smaller than the back surface area Sp of the speaker 78. Accordingly, there is no extreme drop in the back output of the speaker 78 that is extracted from the sound conducting area Sg.

Figure 7:
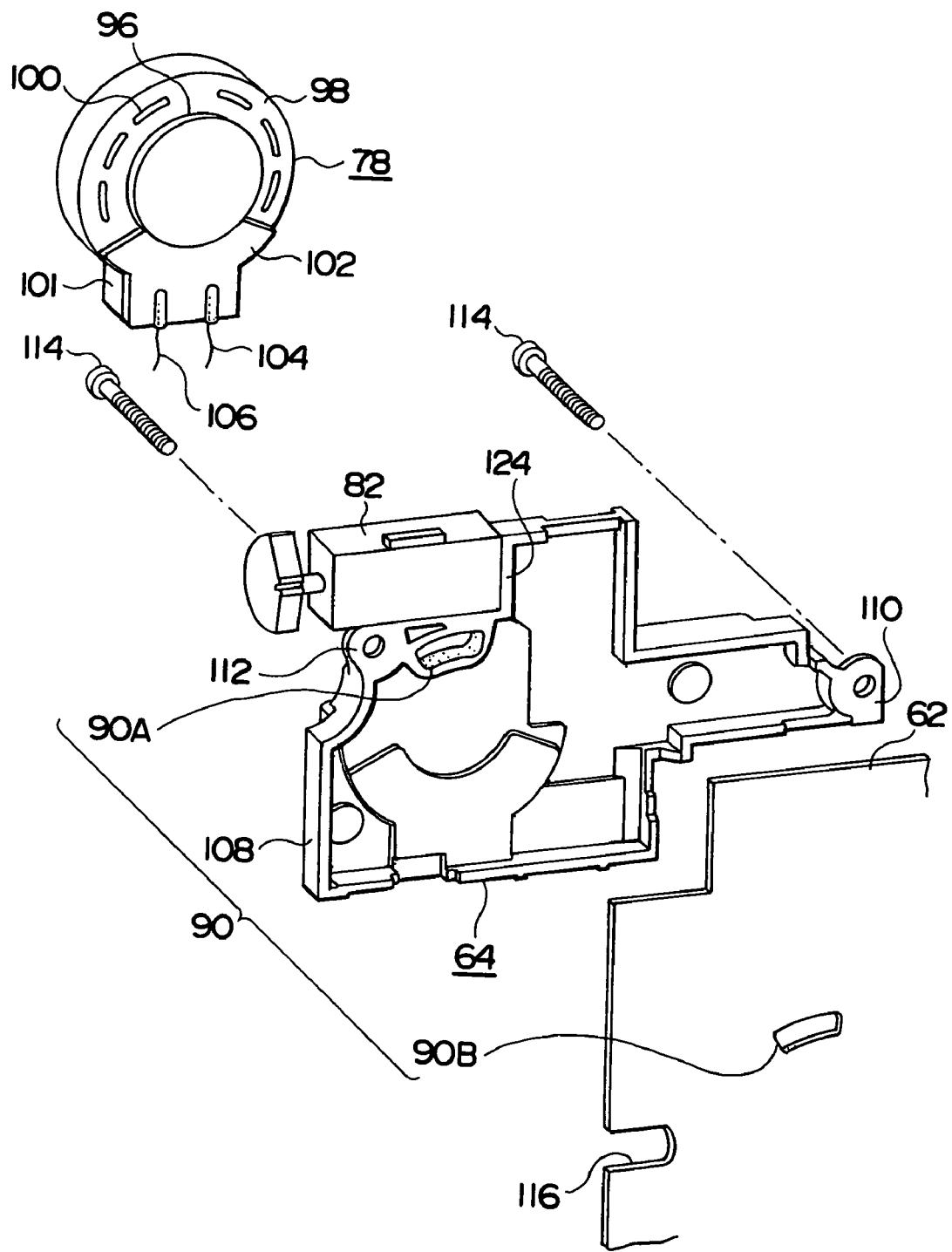
FIG. 7 is an exploded perspective view which shows the sound conducting structure of the operating part.

Furthermore, as is shown in FIG. 7, a circular speaker unit part 96 protrudes from the back surface part of the speaker 78, and a plurality of sound holes 100 which are used to extract the back output are formed in an annular configuration in a housing part 98 that surrounds this speaker unit part 96. Furthermore, a terminal plate 102 is attached to a terminal part 101 formed on housing part 98, and lead wires 104 and 106 of the speaker unit part 96 are led out from this terminal plate 102. Moreover, the sound conducting hole 90A of the speaker holder 64 is opened in a surrounding wall 108 that is formed on the back surface side of the speaker holder 64, and this surround wall part 108 is tightly attached to the surface of the wiring board 62. Attachment parts 110 and 112 are formed on the speaker holder 64, and fastening is accomplished by passing screws 114, for example, through cut-out parts 116 in the wiring board 62, through-holes 118 in the key case 60 (FIG. 4) and the like, and tightening these screws 114 in the screw holes of fastening parts 120 and 122 (FIG. 4) of the front case 50. As a result of this fastening, the contact surface 124 of the surrounding wall part 108 of the speaker holder 64 is tightly contacted with the surface of the wiring board 62. Furthermore, the sound conducting hole 90B formed in the wiring board 62 is formed in a position that coincides with the position of the sound conducting hole 90A of the speaker holder 64, so that the sound conducting holes 90A and 90B are caused to communicate in an air-tight manner by the tight fastening of the speaker holder 64.

Figure 8:
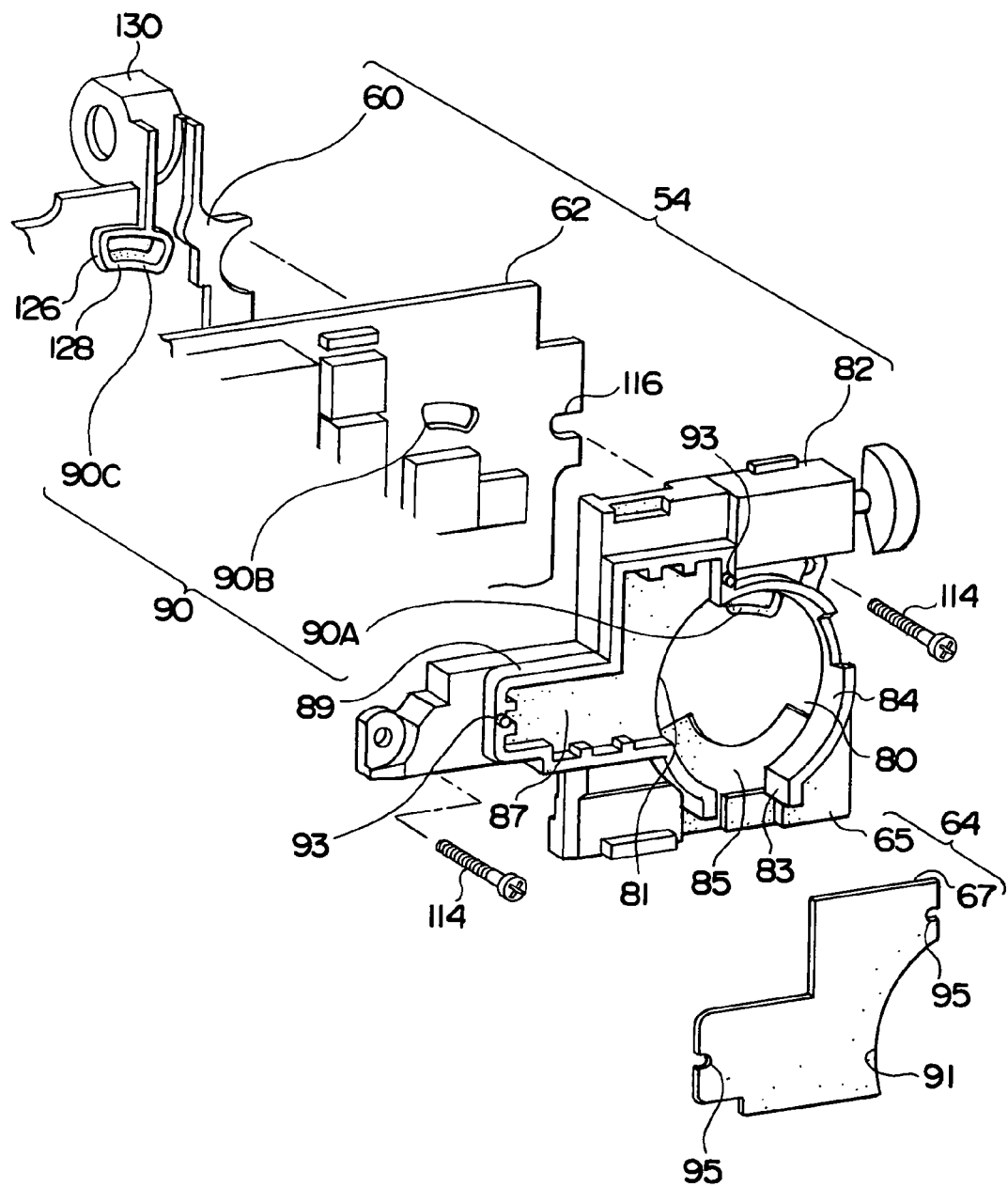
FIG. 8 is an exploded perspective view which shows the sound conducting structure of the operating part.
Figure 9:
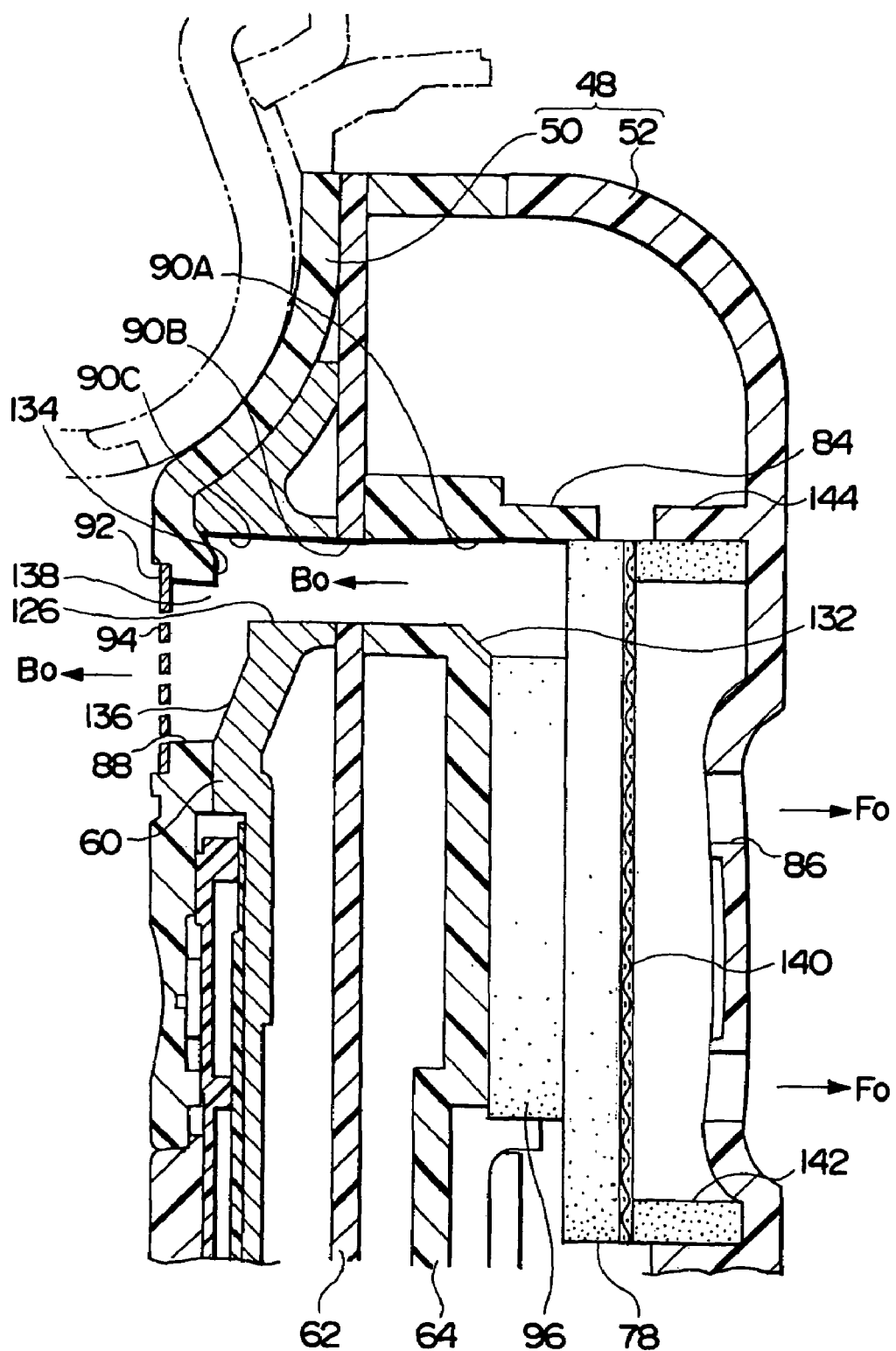
FIG. 9 is a longitudinal sectional view which shows the sound conducting structure of the operating part.

Furthermore, as is shown in FIG. 8, a sound conducting hole 90C is formed with a surrounding wall part 126 in the key case 60 in a position that corresponds to the respective sound conducting holes 90A and 90B. When this key case 60 is fastened in place by being sandwiched between the wiring board 62 and the back surface part of the front case 50, the contact surface 128 of the surrounding wall part 126 in which the sound conducting hole 90C is formed is tightly contacted with the wiring board 62, so that the sound conducting hole 90C and sound conducting hole 90B communicate with each other. 130 indicates the bearing part of the hinge part 36.

Furthermore, the speaker holder 64 comprises a holder main body part 65 and a cover part 67, and this holder main body part 65 and cover part 67 are constructed from synthetic resin molded bodies, for example. In this speaker holder 64, a surrounding wall 84 which surrounds a portion of the circumferential surface part of the speaker 78 is formed on the speaker attachment part 80 of the holder main body part 65, and a recessed part 81 to engage the housing part 98 is formed in the speaker attachment part 80. Further, a penetration part 83 through which the terminal part 101 of the housing part 98 and the terminal plate 102 are passed is formed in the surrounding wall 84. Moreover, a recessed part 85 corresponding to the terminal plate 102 is formed in the speaker attachment part 80, and the terminal plate 102 is fitted in this recessed part 85.

Furthermore, a resonant space 87 for enlarging the back space of the speaker 78 is formed in this holder main body part 65. This resonant space 87 is a closed-off space which is constructed from a surrounding wall part 89 that is continuous with the surround wall 84, and a cover part 67 that closes off this surrounding wall part 89. A circular-arc-form cut-out part 91 that corresponds to the shape of the speaker attachment part 80, i.e., the circumferential surface shape of the housing part 98 of the speaker 78, is formed in the cover part 67, and this cut-out part 91 is joined with the housing part 98 of the speaker 78. Furthermore, as a construction for positioning and engaging the cover part 67 and the surrounding wall part 89, a plurality of cylindrical engaging projections 93 for example are formed on the top part of the surrounding wall part 89, and a plurality of circular engaging recesses 95 into which these engaging projections 93 are inserted are formed in the cover part 67. The cover part 67 and surrounding wall part 89 are positioned and fastened together by the engagement of these engaging projections 93 and engaging recesses 95, and the top part of the surrounding wall part 89 and the cover part 67 are sealed by an adhesive material such as an adhesive tape or the like. As a result of such a construction, a resonant space 87 that communicates with the speaker attachment part 80 is formed in the back surface part of the speaker 78, so that the back output of the speaker 78 resonates in this resonant space 87 in the speaker holder 64.

Furthermore, as is shown in FIG. 9, the case 48 is formed by the joining of the front case 50 and back case 52, and case internal members 54 are contained in this internal space. The key pad 56, dome key 58, key case 60, wiring board 62 and speaker holder 64 that constitute these case internal members 54 are joined in a tightly adhering configuration, and the respective sound conducting holes 90A, 90B and 90C communicate so that a sound conducting hole 90 is formed. Since the respective members adhere tightly to each other, the sound conducting hole 90 is a connected entity comprising a plurality of sound conducting holes 90A, 90B and 90C, but is formed as a tubular part constructed from wall surfaces that possess air-tightness.

This sound conducting hole 90 communicates with the back surface part of the speaker 78 held in the speaker holder 64, and conducts the back output to the sound emission hole 88 of the front case 50. In this case, a tapered surface 132 formed in the entrance part of the sound conducting hole 90A of the speaker holder 64 functions as a guide part for the back output Bo of the speaker 78. In this embodiment, the position of the sound emission hole 88 formed in the front case 50 differs from that of the sound conducting hole 90, so that the sound emission hole 88 is formed in a position that is slightly shifted toward the side of the key buttons 38, and the sound emission area is set at a sound emission area Sr that is larger than the sound conducting area Sg of the sound conducting hole 90 (Sr>Sg). A projecting part 134 which faces the sound conducting hole 90 is formed on the back surface side of the front case 50, and a horn part 136 comprising tapered surfaces that expand the sound conducting hole 90C is formed on the front surface side of the key case 60. A constricted part 138 is formed in the boundary area between this horn part 136 and the sound conducting hole 90. The back output Bo that has passed through the sound conducting hole 90 passes through the constricted part 138 and is amplified by the horn part 136 that opens toward the front surface side.

Furthermore, the front surface part of the speaker 78 is caused to face the sound emission hole 86 of the back case 52, and a protective net 140 is disposed between this front surface part and the sound emission hole 86 of the back case 52, so that dust is prevented from entering the interior of the case 48 from the sound emission hole 86. The protective net 140 is attached to a supporting ring 142 comprising an elastic body, and this supporting ring 142 is arranged inside a surrounding wall 144 formed around the sound emission hole 86 on the back case 52, and is fastened to the back case 52 by an adhesive material such as an adhesive tape or the like.

In such a construction, the front output Fo of the speaker 78 is emitted from the sound emission hole 86 of the back case 52, and the back output Bo of the speaker 78 is efficiently conducted to the sound emission hole 88 of the front case 50 via the sound conducting hole 90 without being blocked by the case internal members 54, and is emitted. The sound conducting area Sg of the sound conducting hole 90 is smaller than the back surface area Sp of the speaker 78, so that the sound pressure loss caused by the sound conducting hole 90 is low. Accordingly, there is no loss of the front output Fo, and the sound pressure level of the front output is not lowered.

Furthermore, since the sound conducting hole 90 forms a tubular part which possesses air-tightness through the case internal members 54, the back output Bo that passes through the sound conducting hole 90 is efficiently conducted to the sound emission hole 88 without any occurrence of sound leakage inside the case 48. Furthermore, since this output is amplified and extracted by the horn part 136 disposed on the front surface part of the key case 60, a sufficient sound volume level is realized.

Accordingly, in cases where the sound emission hole 88 is blocked by the display part 34 as a result of the display part 34 being folded over the operating part 32, the front output Fo of the speaker 78 is obtained from the sound emission hole 86 in the back surface side of the operating part 32. Consequently, the calling sound during ordinary use can be heard.

Furthermore, in cases where the operating part 32 and display part 34 are opened, and the operating part 32 is (for example) placed on a desk top so that the sound emission hole 86 in the back surface side of the operating part 32 is blocked as shown in FIG. 3, the back output Bo of the speaker 78 can be obtained from the sound emission hole 88 in the front surface side of the operating part 32, so that the calling sound and communications sound can be heard with a sufficient sound volume.

In this case, when communications are performed in a hands-free state, communications can be accomplished by listening to the communications sound from the sound emission hole 88. Furthermore, communications can be accomplished while sending a video image of the speaker or the like utilizing the camera 44. This can also be utilized in cases where video and voice are recorded.

Furthermore, in this mobile telephone 30, since the speaker 78 is supported in the speaker holder 64 and disposed in the case 48, the position of a small, light-weight speaker 78 can be set with a high degree of precision, and the positions of the speaker 78 and sound conducting hole 90 formed in the case internal members 54 can be set with high precision, so that the back output Bo can be conducted to the sound emission hole 88 in the front surface side of the operating part 32, amplified and extracted.

Next, modifications of the embodiment of the mobile terminal of the present invention described above, as well as other technically expandable features will be described below as examples.

(1) In the abovementioned embodiment, a mobile telephone was described as an example. However, the present invention can be applied to various types of mobile terminals equipped with speakers, such as PDA, PHS, PC, hand-held PC, other information mobile terminals, digital cameras and the like, and is not limited to the mobile telephone of the embodiment.

(2) In the abovementioned embodiment, a mobile telephone in which the speaker 78 was disposed on the side of the operating part 32 was described as an example. However, the present invention can also be used in cases where the speaker 78 is disposed on the side of the display part 34.

(3) In the abovementioned embodiment, a construction was used in which the front output Fo of the speaker 78 was extracted on the side of the sound emission hole 86. However, it would also be possible to use a construction in which the back output Bo of the speaker 78 is extracted from the sound emission hole 86, and the front output Fo is emitted from not only the sound conducting hole 90 but also from the sound emission hole 88. Accordingly, the front output Fo and back output Bo of the speaker 78 are not envisioned as absolute outputs; if the back surface side of the speaker 78 is used as the front surface, this output therefrom becomes the front output, and if the front surface side of the speaker 78 is used as the back surface, this output becomes the back output.

(4) In the abovementioned embodiment, a case 48 constructed from first and second cases, i.e., a front case 50 and back case 52, was described as an example. However, the case used in the present invention also includes cases that comprise a single case. For example, a configuration in which a single case is closed off by a cover is also included in the case of the present invention.

A most preferred embodiment and the like of the present invention have been described above. However, the present invention is not limited to the above description. It goes without saying that various modifications and alterations may be made by a person skilled in the art on the basis of the gist of the invention that is described in the claims and disclosed in the detailed description of the invention, and that such modifications and alterations are included in the scope of the present invention.

The entire disclosure of Japanese Patent Application No. 2003-169822 including specification, claims, drawings and summary is incorporated herein by reference in its entirety.

What is claimed is:

1. A mobile terminal comprising:
    a first sound emission part which is formed in one surface part of a case housing a speaker, and which conducts the front output of said speaker to the outside of the case;
    a sound conducting hole which is formed in case internal members, which case internal members comprise at least a key case, wiring board, and speaker supporting member supporting said speaker, disposed inside said case, and which causes the back output of said speaker to pass through said case internal members inside said case, and conducts this output to another opposed surface of said case,
    wherein the key case, wiring board and speaker supporting member adhere tightly to each other, with the key case having a key case sound conducting hole, the wiring board having a wiring board sound conducting hole and the speaker supporting member having a speaker supporting member sound conducting hole which align with and communicate directly with each other to form said sound conducting hole; and
    a second sound emission part which is formed in said another opposed surface part of said case, and which conducts said back output conducted by said sound conducting hole to the outside of the case.

2. A mobile terminal according to claim 1, wherein said case comprises a first case and a second case, said first sound emission part is formed in the first case which covers the front surface side of said speaker, and said second sound emission part is formed in said second case.

3. A mobile terminal according to claim 1, wherein said speaker supporting member supporting said speaker is fastened to said wiring board incorporated in said case.

4. A mobile terminal according to claim 1, wherein said sound conducting hole is a tubular part which possesses airtightness.

5. A mobile terminal according to claim 1, wherein a sound conducting hole having an area that is smaller than the back surface side area of said speaker is formed in the speaker supporting member that covers the back surface side of said speaker.

6. A mobile terminal according to claim 1, wherein said case is formed from a synthetic resin or metal.

* * * * *